United States Patent [19]
Gartner et al.

[11] Patent Number: 5,988,140
[45] Date of Patent: Nov. 23, 1999

[54] ENGINE MANAGEMENT SYSTEM

[75] Inventors: Paul M. Gartner, Dearborn; Bradley J. Darin, White Lake; Werner List, Ann Arbor; Dennis P. Nick, Livonia, all of Mich.

[73] Assignee: Robert Bosch Corporation, Broadview, Ill.

[21] Appl. No.: 09/107,119

[22] Filed: Jun. 30, 1998

[51] Int. Cl.⁶ .................................................. F02D 41/18
[52] U.S. Cl. .............................. 123/406.24; 123/406.25; 123/436; 123/480; 123/488; 701/110
[58] Field of Search .............................. 123/305, 406.24, 123/406.25, 436, 437, 480, 486, 488; 701/104, 110, 111

[56] References Cited

U.S. PATENT DOCUMENTS

| | | | |
|---|---|---|---|
| 3,969,614 | 7/1976 | Moyer et al. | 235/150.24 |
| 4,276,600 | 6/1981 | Hartford et al. | 364/431 |
| 4,309,759 | 1/1982 | Tokuda et al. | 364/431.05 |
| 4,309,971 | 1/1982 | Chiesa et al. | 123/480 |
| 4,403,584 | 9/1983 | Suzuki et al. | 123/417 |
| 4,433,381 | 2/1984 | Wilkinson | 364/431.05 |
| 4,590,563 | 5/1986 | Matsumura et al. | 364/431.05 |
| 4,725,955 | 2/1988 | Kobayashi et al. | 364/431.05 |
| 4,814,997 | 3/1989 | Matsumura et al. | 364/431.05 |
| 4,829,440 | 5/1989 | Abe | 364/431.05 |
| 4,840,245 | 6/1989 | Kamei et al. | 180/179 |
| 4,870,586 | 9/1989 | Asakura et al. | 364/431.05 |
| 4,879,656 | 11/1989 | Quigley et al. | 364/431.05 |
| 4,884,547 | 12/1989 | Tamura | 123/489 |
| 4,887,216 | 12/1989 | Ohnari et al. | 364/431.05 |
| 4,893,600 | 1/1990 | Holmes | 123/419 |
| 4,911,128 | 3/1990 | Hara et al. | 123/488 |
| 4,951,206 | 8/1990 | Kyohzuka | 364/431.05 |
| 4,991,102 | 2/1991 | Sakamoto et al. | 364/431.05 |
| 5,021,956 | 6/1991 | Yoshimura et al. | 364/424.1 |
| 5,021,959 | 6/1991 | Jundt et al. | 364/431.05 |
| 5,099,429 | 3/1992 | Onari et al. | 364/431.05 |
| 5,121,324 | 6/1992 | Rini et al. | 364/431.05 |
| 5,184,589 | 2/1993 | Nonaka | 364/431.05 |
| 5,191,531 | 3/1993 | Kurosu et al. | 364/431.05 |
| 5,218,945 | 6/1993 | Kapellen et al. | 123/687 |
| 5,249,130 | 9/1993 | Mamiya et al. | 364/431.05 |
| 5,278,762 | 1/1994 | Kawamura | 364/431.05 |
| 5,284,116 | 2/1994 | Richeson, Jr. | 364/431.05 |
| 5,341,299 | 8/1994 | Stellwagen et al. | 364/431.05 |
| 5,445,014 | 8/1995 | Fiorenza, II et al. | 73/117.3 |
| 5,485,382 | 1/1996 | Seki et al. | 364/431.05 |
| 5,548,514 | 8/1996 | Hasegawa et al. | 364/431.05 |
| 5,566,071 | 10/1996 | Akazaki et al. | 364/431.05 |
| 5,575,268 | 11/1996 | Hirano et al. | 123/701 |
| 5,629,853 | 5/1997 | Ogawa et al. | 364/431.05 |
| 5,672,817 | 9/1997 | Sagisaka et al. | 73/118.1 |
| 5,684,248 | 11/1997 | Iwata | 73/118.1 |

FOREIGN PATENT DOCUMENTS

| | | |
|---|---|---|
| 2196153 | 4/1988 | United Kingdom . |
| 2237388 | 5/1991 | United Kingdom . |
| 2313200 | 11/1997 | United Kingdom . |

*Primary Examiner*—Willis R. Wolfe
*Assistant Examiner*—Mahmoud M. Gimie
*Attorney, Agent, or Firm*—Greer, Burns & Crain, Ltd.

[57] ABSTRACT

An engine management system for 4-cycle engines includes a processing means and utilizes various inputs from sensors operatively connected to the engine for the purpose of providing the correct fuel/air ratio or spark ignition angle for the engine in a manner whereby the transient response is fast. The engine management system utilizes the rotational speed information that is obtained from a magneto or speed sensor to determine the speed of each engine revolution. The system effectively solves many of the fuel/air ratio problems that are caused by load transients occurring on the engine. By comparing such high pass filtered speeds of selected revolutions, the system is able to determine the inferred engine intake air flow. By using measured system rotational inertia compensation factors for the engine together with the inferred intake air flow, the system can accurately determine the amount of fuel to be fed to the engine for proper operation.

26 Claims, 10 Drawing Sheets

RESULTS OF SPEED DELTA CALCULATIONS:

CASE 1
SPEED DELTA =
POWER CYCLE SPEED - PREVIOUS CYCLE SPEED

CASE 2:
SPEED DELTA =
POWER CYCLE SPEED - FOLLOWING CYCLE SPEED

P1 - N1 = 100
P2 - N2 = 100
P3 - N3 = 100
P4 - N4 = 200
P5 - N5 = 200
P6 - N6 = 200
P7 - N7 = 100
P8 - N8 = 100

← THIS EQUATION INDICATES A GREATER SPEED DELTA DURING THIS TYPE OF TRANSIENT.

P1 - N2 = 100
P2 - N3 = 100
P3 - N4 = 100
P4 - N5 = 100
P5 - N6 = 100
P6 - N7 = 100
P7 - N8 = 100

RESULTS OF SPEED DELTA CALCULATIONS:

CASE 1:
SPEED DELTA =
POWER CYCLE SPEED - PREVIOUS CYCLE SPEED

CASE 2:
SPEED DELTA =
POWER CYCLE SPEED - FOLLOWING CYCLE SPEED

P1 - N1 = 100
P2 - N2 = 100
P3 - N3 = 100
P4 - N4 = 150
P5 - N5 = 150
P6 - N6 = 150
P7 - N7 = 100
P8 - N8 = 100

← THIS EQUATION INDICATES A GREATER SPEED DELTA DURING THIS TYPE OF TRANSIENT.

P1 - N2 = 100
P2 - N3 = 100
P3 - N4 =  50
P4 - N5 =  50
P5 - N6 =  50
P6 - N7 = 100
P7 - N8 = 100

RESULTS OF SPEED DELTA CALCULATIONS:

| CASE 1: | | CASE 2: |
|---|---|---|
| SPEED DELTA = | | SPEED DELTA = |
| POWER CYCLE SPEED - PREVIOUS CYCLE SPEED | | POWER CYCLE SPEED - FOLLOWING CYCLE SPEED |
| P1 - N1 = 100 | THIS EQUATION | P1 - N2 = 100 |
| P2 - N2 = 100 | INDICATES A | P2 - N3 = 150 |
| P3 - N3 = 50 | GREATER SPEED | P3 - N4 = 150 |
| P4 - N4 = 50 | DELTA DURING | P4 - N5 = 150 |
| P5 - N5 = 50 | THIS TYPE | P5 - N6 = 150 |
| P6 - N6 = 100 | OF TRANSIENT. | P6 - N7 = 100 |
| P7 - N7 = 100 | | P7 - N8 = 100 |
| P8 - N8 = 100 | | |

ENGINE MANAGEMENT SYSTEM

The present invention generally involves an engine management system for controlling the ignition timing and air/fuel ratio of a 4-cycle engine. The system utilizes inputs from an engine speed sensor, an engine temperature sensor and an exhaust oxygen sensor.

There have been many improvements in developing control systems for internal combustion engines of all types and sizes, including 4-cycle engines that may be of relatively small size, i.e., 5 to 10 horsepower, but can be much larger, i.e., up to 100 horsepower or more. Such larger 4-cycle engines may be used in industrial applications such as welding or emergency generator sets, to name a few examples, where it is important that the engine run smoothly and at the desired speed regardless of changes in applied load and other perturbations that may occur. While advances have been made in the art of engine control, there continues to be a need for improving the control of such engines to insure that they operate efficiently and effectively under various operating conditions.

Accordingly, it is a primary object of the present invention to provide an improved engine management system that controls the ignition timing and air/fuel ratio of a 4-cycle engine in the manner that results in reliable efficient and effective engine operation.

It is another object of the present invention to provide an improved electronic engine management system that reduces emissions, improves startability and optimizes fuel economy of the engine.

Still another object of the present invention is to provide such an improved engine management system that has fast transient response to perturbations that occur. This is achieved at least in part because of the manner in which applied load is measured and used to determine fuel flow requirements during operation.

A more detailed object lies in the provision for using processing means including memory having look up tables for determining the fuel flow requirements based upon engine operating parameters.

Yet another object is to provide an improved engine management system that determines the engine intake air flow by means other than measuring the air flow itself with the determination being highly reliable and inexpensively obtained.

Still another object of the present invention is to provide such an improved engine management system which effectively determines the engine intake air flow by effectively measuring the load applied to the engine.

Another object of the present invention is to provide such an improved engine management system which utilizes a compensating factor for the engine intake air flow that takes into consideration the rotational inertia of the engine which is used to provide a more accurate fuel flow mapping functionality.

Still another object of the present invention is to provide such an improved system which enables system inertia to be determined for all engines of a particular size, type and application, by performing tests in a laboratory to generate inertia characteristics for such engines. Utilizing rotational speed measurements of the engine that are taken in the field, an inertia factor is adjusted for each engine. Such capability enables the inertia factor to be accurately determined during use and they can be periodically determined so that the inertia factor can be corrected if the engine characteristics change over time and use.

These and other objects will become apparent while reading the following detailed description in conjunction with the attached drawings, in which.

Figure 9:
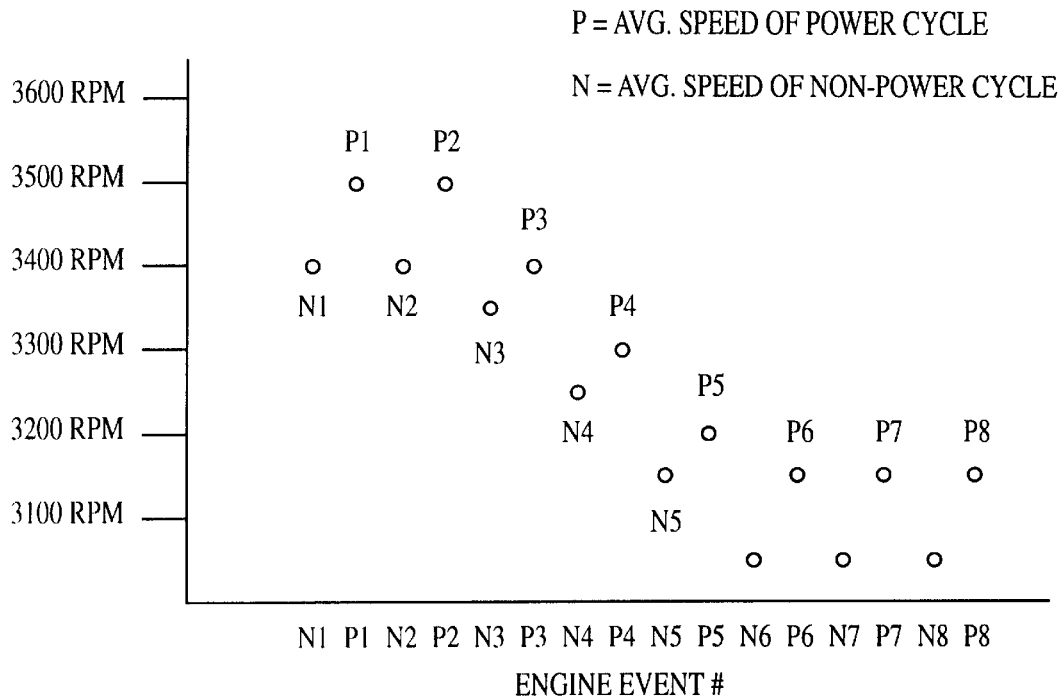
Figure 10:
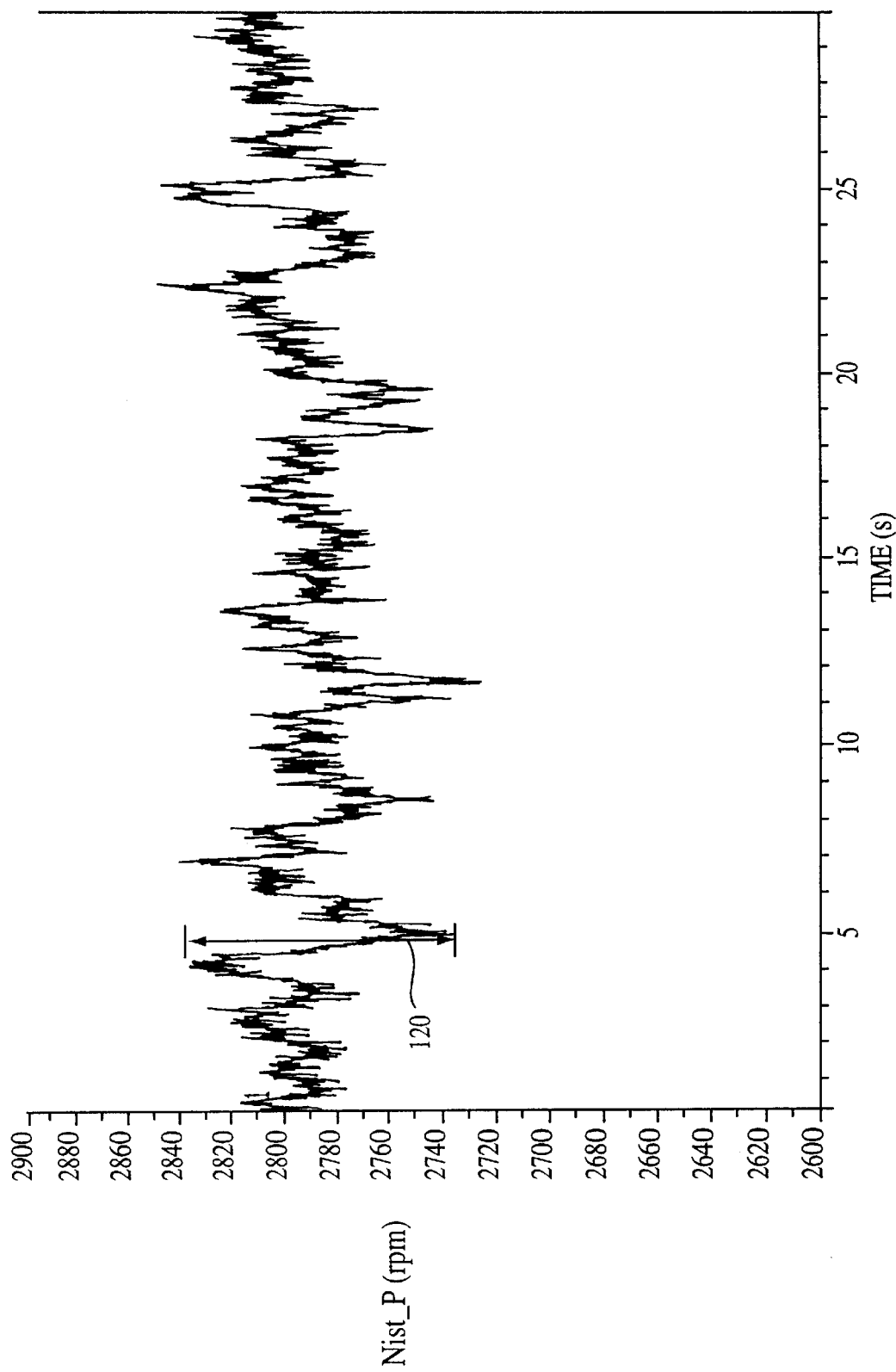

FIG. 9 is a chart illustrating engine event frequency versus corresponding speed delta calculations during transient operation, particularly illustrating the throttle angle remaining constant, the engine intake air flow remaining constant and the shaft output load increasing momentarily; and, FIG. 10 is a chart which illustrates the change of engine speed versus time as a result of variations which include both high frequency and low frequency content

DETAILED DESCRIPTION

Broadly stated, the present invention is directed to an improved engine management system for 4-cycle engines which includes a processing means and utilizes various inputs from sensors operatively connected to the engine for the purpose of providing the correct fuel/air ratio for the engine in a manner whereby the transient response is very fast. This enables the engine to be operated efficiently and smoothly even during various transient conditions.

The engine management system embodying the present invention is one which utilizes the rotational speed information that is obtained from either a magneto, a variable reluctance incremental speed detector, or a tachometer to determine the time duration of each crankshaft or engine revolution. From these time durations, the cyclic speed is determined. The variable reluctance incremental speed detector can be used to determine instantaneous speed during a portion of each revolution, if desired. By comparing such speeds of selected revolutions, the system is able to determine the inferred engine intake air flow, without having to actually physically measure the same. Also, by using measured system rotational inertia values for the engine together with the inferred intake air flow, the system can accurately determine the amount of fuel to be fed to the engine for proper operation.

The inertia factor for a particular type of engine is determined through actual tests in a laboratory, which results in a default value that is initially used for all of such engines of that particular type. However, the system is uniquely adapted to periodically correct the inertia factor by means of a statistical analysis of speed information from a number of cycles during actual operation under predetermined conditions. More particularly, the system utilizes statistical analysis, such as a standard deviation calculation or a variance calculation on a number of samples of engine speed taken over a number of revolutions and uses the statistical analysis to interpolate between predetermined inertia factors to provide an inertia factor value that is used to compensate the inferred air flow.

The system also utilizes look up tables which are provided as a result of the laboratory calculation and the look up tables provide a fuel flow value as a function of the adjusted inferred air flow.

Figure 1:
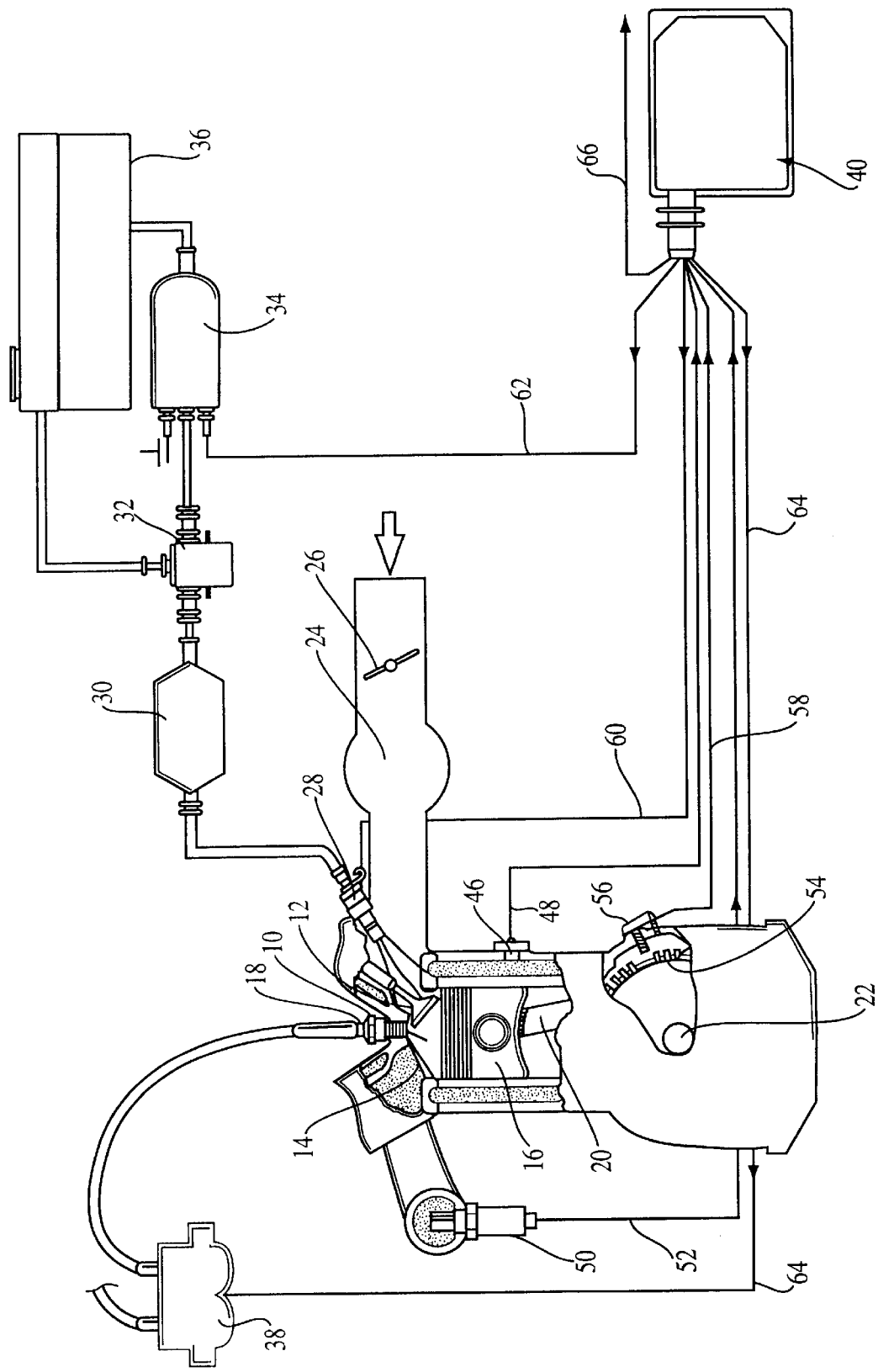
FIG. 1 is an idealized plan view of a 4-cycle engine shown partially in section with various components being functionally illustrated in conjunction with a portion of the engine management system embodying the present invention.

Turning now to the drawings, and particularly FIG. 1, there is shown a general system overview of the present invention in connection with a 4-cycle engine, which includes a combustion chamber 10 having an intake valve 12, an exhaust valve 14, a piston 16, a spark plug 18, a rod 20 that is connected to the crankshaft 22. The engine also has an air intake 24 in which a throttle 26 is positioned. Fuel is fed to the combustion chamber 10 by an injector 28 that is connected to a fuel filter 30, pressure regulator 32 and an electric fuel pump 34 to a gas reservoir 36. It should be appreciated that the fule pump 34 can alternatively be a mechanical pump that optionally can include a pressure regulator functionality. The spark plug 18 is fired by an ignition coil 38 or a magneto. It should also be understood that if a magneto is used in place of the ignition coil 38, the magneto will eliminate the need for the speed sensor 56. Also, the magneto may be normally provided by the engine manufacturer, and when provided, typically included an ignition circuit that controls the angular position of the spark occurrence.

An electronic control unit embodying the present invention is shown at 40 and includes lines which extend to and from various sensors for controlling the operation of the engine. More particularly, the control unit 40 has an input from a temperature sensor 46 via line 48. An oxygen sensor 50 is mounted in the exhaust manifold and provides the signal relating to the sensed oxygen to the control unit 40 via line 52. A toothed wheel 54 is operatively connected to the crankshaft 22, and a speed and reference mark sensor 56 provides speed information via line 58 to the control unit 40. The control unit 40 has an output line 60 that extends to the fuel injector 28 for controlling the same and also has an output line 62 extending to the fuel pump 34 for controlling its operation. Similarly, output line 64 extends to the ignition coil 38 for controlling the timing of ignition. A serial communications line 66 extends from the control unit 40 for the purpose of performing diagnostic tests and the like, and for communicating with the microprocessor.

Figure 2:
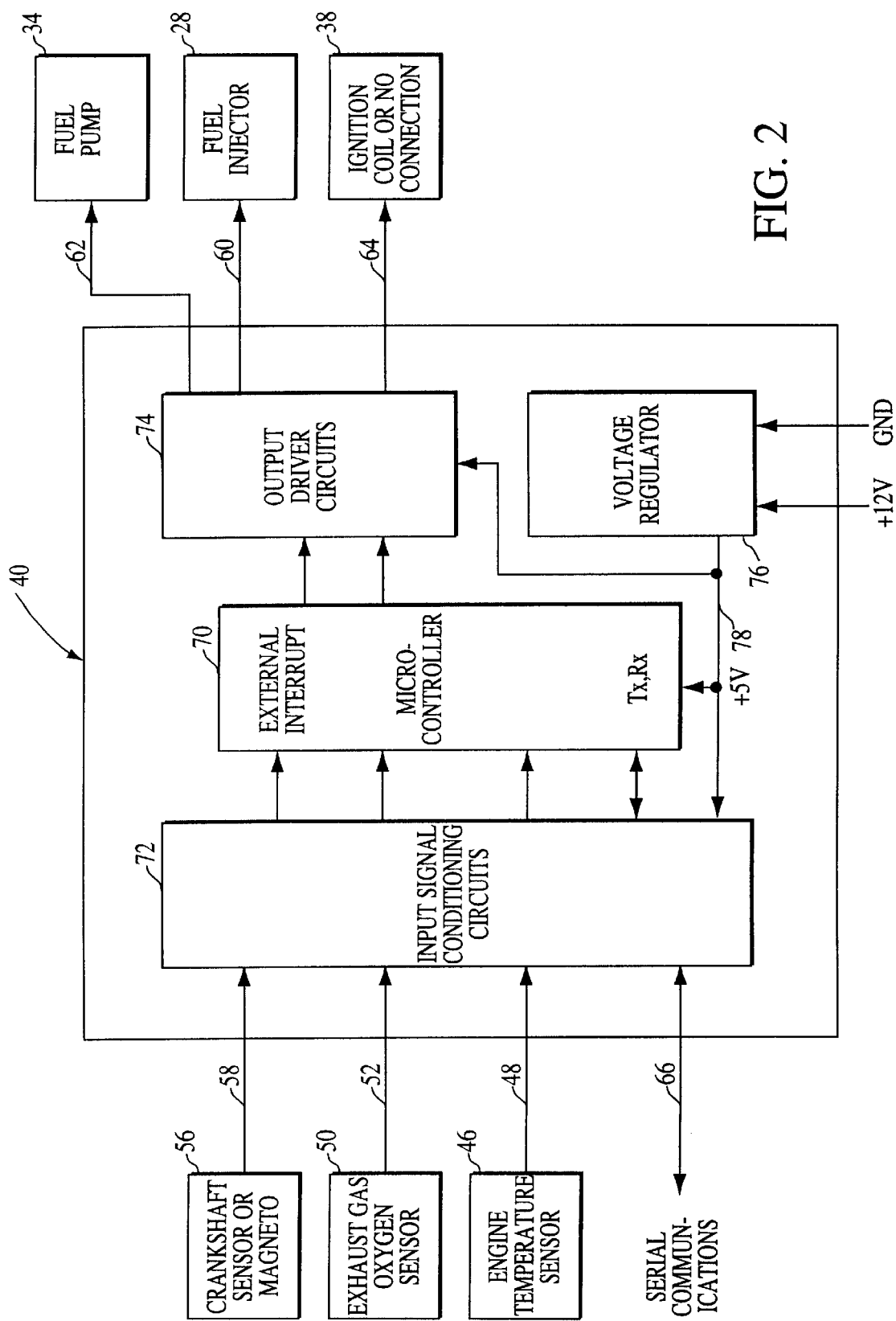
FIG. 2 is a block diagram of the engine management system embodying the present invention shown together with various input sensors and devices and shown with output signals for controlling portions of the engine which are diagrammatically illustrated.

The control unit 40 is also shown in FIG. 2 with the various input and output lines and sensors also being identified. The control unit 40 has a microprocessor 70 which receives the input signals from the sensors after having been conditioned by conditioning circuit 72 and provides outputs to output driver circuit 74 which then control the fuel injector 28 and ignition coil 38. A voltage regulator 76 is provided which provides suitable supply voltages via line 78 to the various circuits and the microprocessor 70 as shown.

In accordance with an important aspect of the present invention, the engine intake air flow, which will hereinafter simply be referred to as the air flow, is not actually measured directly, but is accurately determined as a function of the engine speed measurements and of the rotational inertia of the engine. It is well known that for a 4-cycle engine, there is a revolution of the crankshaft during the power cycle and that is followed by a nonpower cycle. Thus, there are alternating power and nonpower cycles during normal operation of the engine. Rather than measure air flow into the engine, the variation in speed for successive revolutions is determined through the use of a sensor associated with the crankshaft or a magneto. The sensor provides a signal at the same rotational position of the flywheel or crankshaft of the engine during each engine revolution and this signal is forwarded to the microcontroller 70 where it measures the time period between the successive signals. The individual speeds (in RPM) are calculated using the measured time durations of each revolution. It should be understood that the microcontroller 70 is particularly suited to perform the timing function, but it could be done by a separate timing circuit if desired. Also, the sensor for providing the rotational position signal can be provided by many well known means, including variable reluctance speed sensors, Hall effect sensors, tachometers, light circuits of various types, and magnetos, to name a few.

During normal operation even with no load conditions, there will be a slowing of the rotational speed of the crankshaft during the nonpower cycle so that the time period for the rotation of the crankshaft for a nonpower cycle will be greater than that which occurs during a power cycle. The difference between the speeds of a power cycle and non-power cycle is referred to herein as the speed delta, and there can be two speed delta calculations for a given power cycle, that being one determined for the previous nonpower cycle and also for following or successive nonpower cycle.

In accordance with an important aspect of the present invention, for each power cycle, the speed delta is calculated for the previous nonpower cycle as well as the successive nonpower cycle and the larger speed delta is employed by the system. It has been found to be highly desirable to use the larger speed delta for the purpose of determining the air flow signal. Depending upon the type of transient condition that may be experienced, the speed delta for the previous nonpower cycle is sometimes used as is the speed delta for the successive nonpower cycle.

Figure 3:
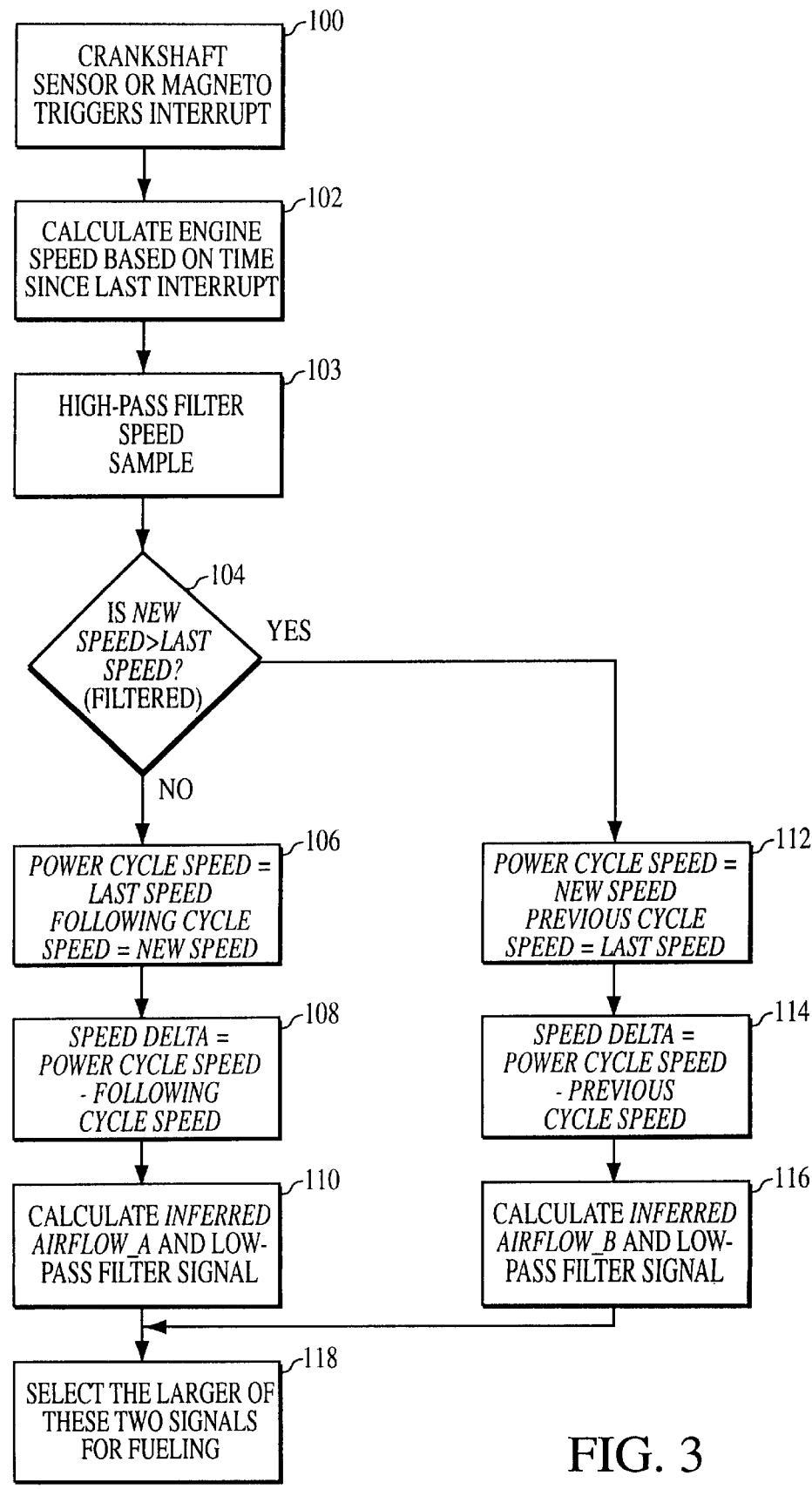
FIG. 3 is a flow chart illustrating operation of the air flow determining portion of the engine management system embodying the present invention.

During operation of the system of the present invention, the flow chart shown in FIG. 3 indicates the processes that are carried out in the microcontroller utilizing the crankshaft sensor or magneto trigger signals which are used to perform the timing function. Thus, the trigger interrupt occurs (block 100) and the engine speed is calculated (block 102) and high-pass-filtered (block 103). At this point the measured new speed is compared with the prior speed (block 104). If the new speed is less than the last speed, the speed delta is then calculated for a power cycle speed and a following cycle speed (blocks 106, 108) and the inferred air flow signal is then calculated and filtered (block 110). If the new speed is greater than the last speed (block 104) then the speed delta is calculated for the power cycle and the previous cycle (block 112, 114) and the inferred air flow signal is calculated and filtered (block 116). From these two calculations, the larger signal is selected (block 118) for use in determining the amount of fuel to be applied to the engine using a look up table.

Figure 5:
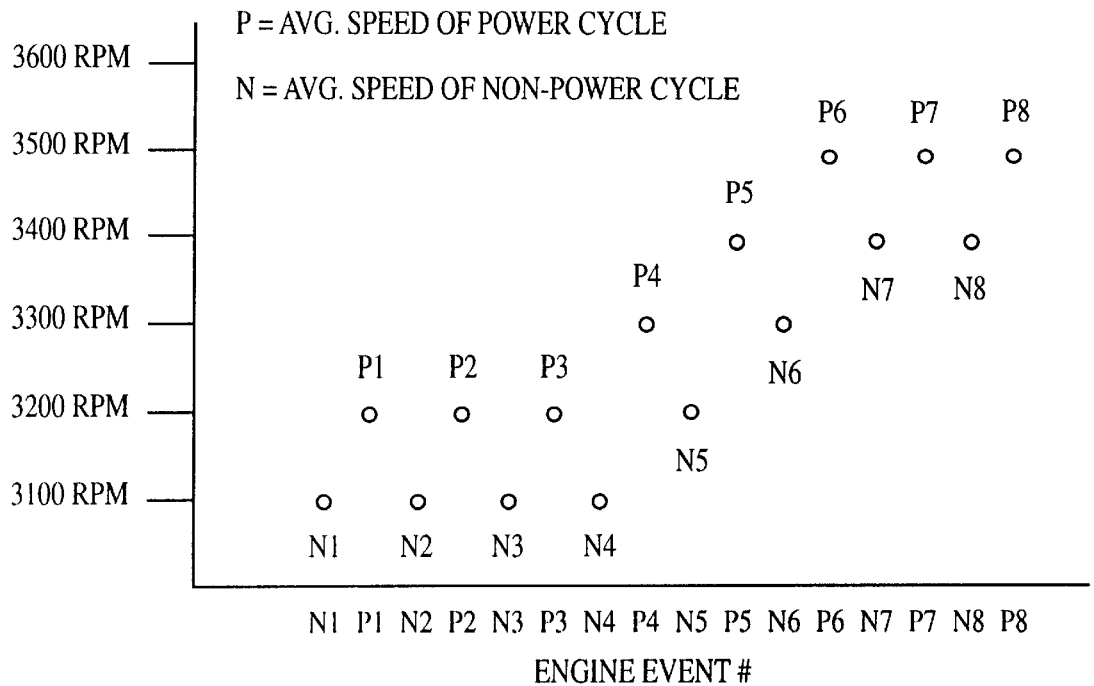
FIG. 5 is a chart illustrating engine event frequency versus corresponding speed delta calculations during transient operation, particularly for the condition of throttle angle increasing momentarily, engine intake air flow increasing momentarily and shaft output load remaining constant.
Figure 6:
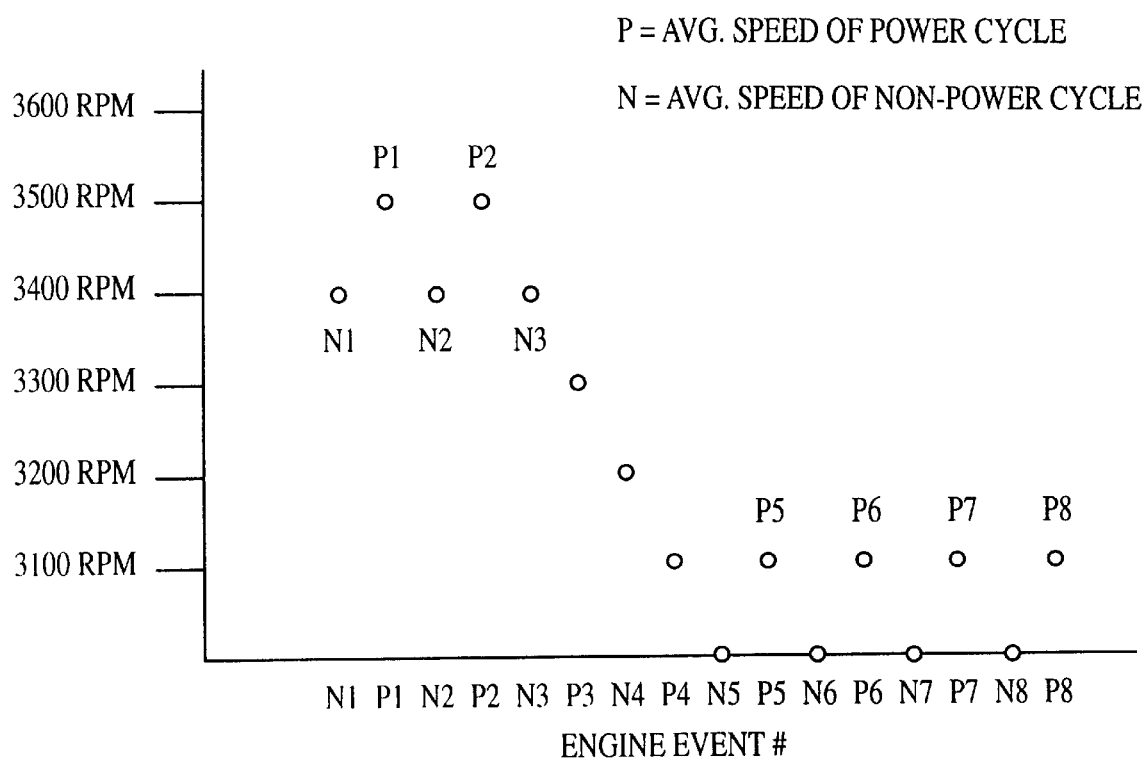
FIG. 6 is a chart illustrating engine event frequency versus corresponding speed delta calculations during transient operation, particularly illustrating the throttle shutting completely momentarily, the engine intake air flow ceasing momentarily and shaft output load remaining constant.
Figure 7:
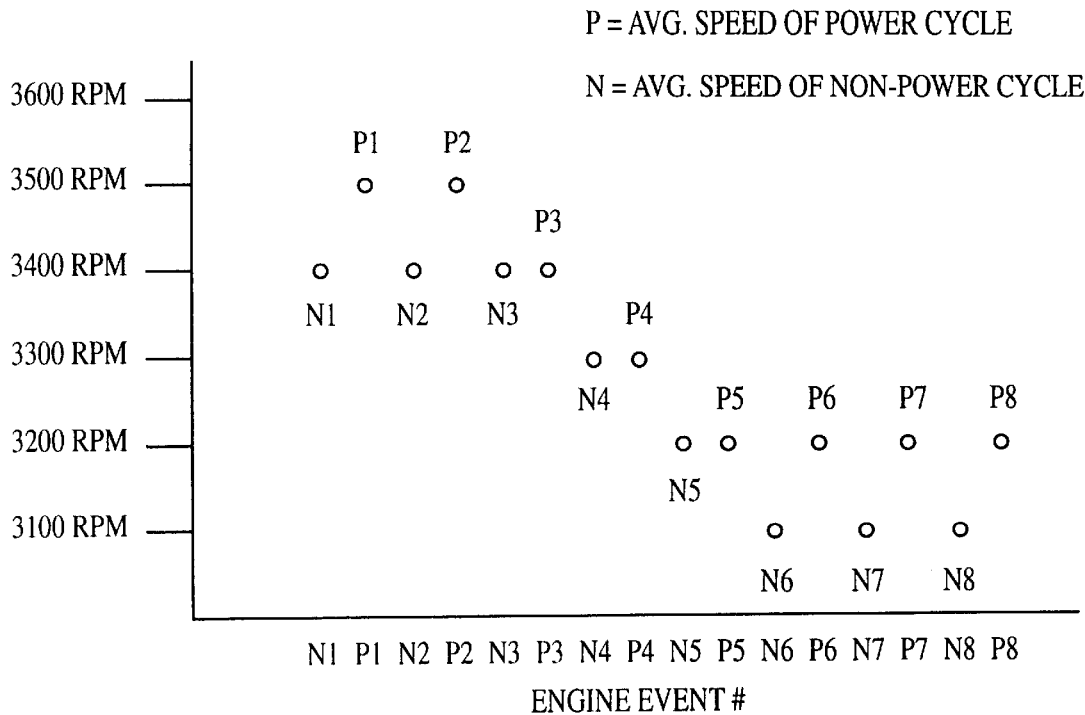
FIG. 7 is a chart illustrating engine event frequency versus corresponding speed delta calculations during transient operation, particularly illustrating the throttle angle decreasing momentarily, engine intake air flow decreasing momentarily and the shaft output load remaining constant.
Figure 8:
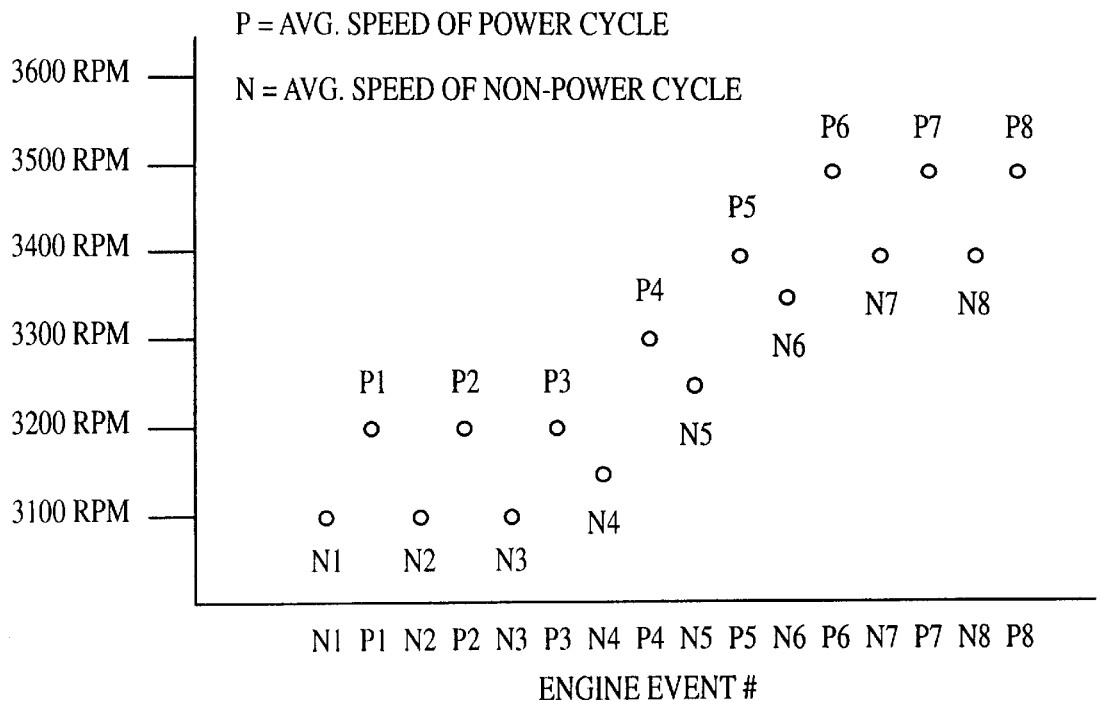
FIG. 8 is a chart illustrating engine event frequency versus corresponding speed delta calculations during transient operation, particularly illustrating the throttle angle remaining constant, the engine intake air flow remaining constant and the shaft output load decreasing momentarily.

It has been found that the larger speed delta calculation occurs with the previous nonpower cycle speed delta calculation in some transient conditions and with the subsequent nonpower cycle speed delta for other transient conditions. This is shown in FIGS. 5–9 which are charts of speed variations during successive power and nonpower cycles for different transient conditions. More particularly, FIG. 5 illustrates how the speed changes for a transient condition where the throttle angle increases momentarily, the air flow increases momentarily and the output load on the crankshaft is constant. The speed delta for the power cycle and the previous nonpower cycle yields the greater value and is used in the air flow signal that is determined. With respect to FIG. 6, the transient condition illustrated is that of the throttle being shut completely momentarily, with the air flow ceasing momentarily and the load on the crankshaft remaining constant. In this transient condition, the speed delta is the same for both calculations. With respect to FIG. 7, the transient condition there is the throttle angle decreasing momentarily, the air flow decreasing momentarily and the crankshaft load remaining constant. In this transient condition, it is indicated that the larger speed delta is that which occurs with the following nonpower cycle. With respect to the transient condition shown in FIG. 8, it consists of a constant throttle angle, constant air flow but with a momentarily decreasing output load applied to the crankshaft. In this instance, the larger speed delta occurs with the power cycle and the previous nonpower cycle. With respect to the transient condition associated with the chart of FIG. 9, it has a constant throttle angle, constant air flow and an increased momentarily increasing output load. In this instance, the larger speed delta is that which is determined from the power cycle and the following nonpower cycle.

From the foregoing charts, it is evident that it is important to consider both speed deltas relative to a power cycle in order to insure that adequate fuel will be supplied to the engine. If only one speed delta were calculated relative to the power cycle, then a reduced air flow signal may be determined, which when mapped to the look up table, would not result in sufficient fuel being supplied to the engine which may then result in uneven operation of the engine. By choosing the greater of the speed deltas for each power cycle, the engine is assured of having a sufficiently rich fuel/air ratio so that even engine operation will be assured.

In accordance with an important aspect of the present invention, it is generally known that speed variations of an engine are caused by low frequency as well as high frequency variables. The frequency content of the speed variation is shown in FIG. 10 with the large vertical changes such as indicated by line 120 representing a low frequency variation that may be caused by changes such as random throttle movement caused by mechanical speed control governor and associated linkage, for example. The higher frequency variability is believed to be due to variability in combustion caused by turbulence, mixture preparation and the like, in addition to the speed delta induced via cyclic combustion and shaft load.

An improvement on the fidelity of the airflow signal can be made by first high-pass-filtering the speed samples before calculating the speed delta. It has been found that the speed delta information is contained in the frequency component that is located at one-half of the rotational frequency. The magnitude of the speed delta is directly related to the magnitude of this component. Thus, if the filter is triggered on every engine revolution, and the cutoff frequency of the high pass filter is one-fourth of the sampling frequency (sampling frequency equals rotational frequency) then the component corresponds to one-half of the sampling frequency, or the speed delta, will be obtained. Thus, the speed delta is obtained by taking the difference between the high-pass-filtered speed samples.

In accordance with yet another important aspect of the present invention, the air flow signal that is used to map into a look up table for fuel flow is certainly proportional to the larger of the two speed deltas that are calculated for any given power cycle, the air flow signal is adjusted or compensated for inertia of the engine. More particularly, the following equation is used to determine the air flow signal:

$$\text{air flow signal} = \frac{(\text{speed delta}) * (\text{inertia factor})}{\text{time duration of most recent cycle}}$$

The inertia factor is a compensating factor that is determined for each type of engine for which the engine management system is used. A range of inertia factors are determined in the laboratory. From this range, a value can be automatically chosen in the field. More particularly, inertia factors can be determined in a laboratory through testing each type of engine. By type of engine, it is meant to identify the manufacturer, the horsepower of the engine and any unique configurations that would affect the rotational or system inertia of the engine. For example, a range can be determined for a particular manufacturer's 25 horsepower engine which would most probably be different from that manufacturer's 50 horsepower engine. However, once the range for a particular engine has been determined, this can be placed in memory associated with the microprocessor and can be used to determine the air flow signal from the above equation.

To determine the inertia factor range, it is preferred that an engine be tested in a laboratory under varied load conditions with predetermined operating conditions. More particularly, an engine is preferably connected to a water brake dynamometer of negligible inertia. The engine is run at standard predetermined operating conditions such as at wide open throttle (WOT) with a 2800 rpm engine speed. Of course, it should be understood that other speeds of operation may be utilized, so long as it can be maintained with the variations that are prescribed. In this regard, the speed delta is measured on the engine and recorded. The test is repeated with a single inertia disk connected to the crankshaft which will result in a decreased speed delta corresponding to an increased inertia. A second disk is then also connected to the crankshaft and the test is again repeated which results in a furter decreased speed delta corresponding to an inertia that is still larger. The air flow signals are then calculated with the inertia factors set to 1, and with the baseline inertia, for example, the air flow signal was calculated to be 100. With a single disk it was calculated to be 73 and with two disks it was calculated to be 56. Because the engine is running at the same operating point, namely wide open throttle at 2800 rpm, the air flow signals should read the same. This can be accomplished by adjusting the inertia factor. Thus, the inertia factor for the baseline is thereby specified to be "1" and for the single disk the inertia factor is multiplied by the ratio of 100/73 or 1.34. Similarly, for two disks, the inertia factor is multiplied by the ratio of 100/56 or 1.79. This results in the air flow signal being at 100 for all three tests.

It is desired that the air flow signal be used as the variable in a look up map to drive the fuel injection system so that correct amounts of fuel will be injected into the engine at all operating points that were calibrated with the base inertia. For a given engine, it is desirable to automatically adjust the inertia factor in relation to these three inertia tests in the field. It has been found that an algorithm can be periodically run to provide an accurate interpolation of the range of inertia factors to compensate for variations in each engine that has been manufactured, or variations that occur over time as the engine is operated in the field.

While it is a matter of choice, the automatic adjustment of the inertia factor can be made each time the engine is started or it can be performed on the basis of some other criteria which would result in it being done less frequently. The automatic measurement is done at some stable operating point, preferably such as a warm engine operating under no load conditions and at a speed of 2800 rpm, for example.

It is also desirable to run a standard deviation calculation on the speed samples of the base inertia determination in the laboratory as well as on the speed samples of the test with single and two disks attached. This results in standard deviation values, for example, for the base engine inertia at no load and 2800 rpm at a value of 30. With the single disk applied to the crankshaft under the same no load and speed conditions results in a standard deviation value of 20 and for the two disks applied to the crankshaft at the same operating points yields a standard deviation value of 10.

Given the standard deviation values that were obtained in the laboratory, the following table will be the inertia factor matched to the standard deviation values set forth:

| Measured Speed Standard Deviation | Inertia Factor Used |
|---|---|
| 30 | 1 |
| 20 | 1.34 |
| 10 | 1.79 |

So if the measured speed standard deviation in the field is 15, for example, then the inertia factor used from this automatic procedure would be an interpolation, calculated as follows:

$$\text{inertia factor used} = \frac{1.34 - (20 - 15)*(1.34 - 1.79)}{20 - 10} = 1.57$$

It has been found that by inspecting the power spectral density or frequency content of the data for the cases of base engine inertia, the base engine inertia plus one disk and the base engine inertia plus two disks shows that the data does indeed consist of both low and high frequency content, with the distribution or width of the higher frequency data being inversely related to the amount of system inertia. An accurate measure of the standard deviation for the purpose of inertia compensation of the air flow signal can be obtained by high pass filtering the speed data with a digital filter having a cut off frequency of approximately 10 Hz, although it may be within the range of 5 to 30 Hz. Thus, the automatic compensation of the inertia factor can be accomplished in the field by accumulating a number of speed samples and performing a standard deviation calculation of those filtered samples to obtain the measured speed standard deviation and this can be used to interpolate the inertia factor.

The speed samples are measured each revolution and the number of samples upon which the standard deviation calculation is used on may vary considerably, with a larger number being statistically more reliable. In this regard, it is contemplated that as few as 20 samples may be used or as many as 2,000. It is unnecessary to accumulate the samples on a very short time period because the adjustment of the default inertia factor is not essential to the engines operation, but will improve it once the adjustment has been made. The default value assures a rich fuel to air ratio until the inertia factor is adjusted.

Figure 4:
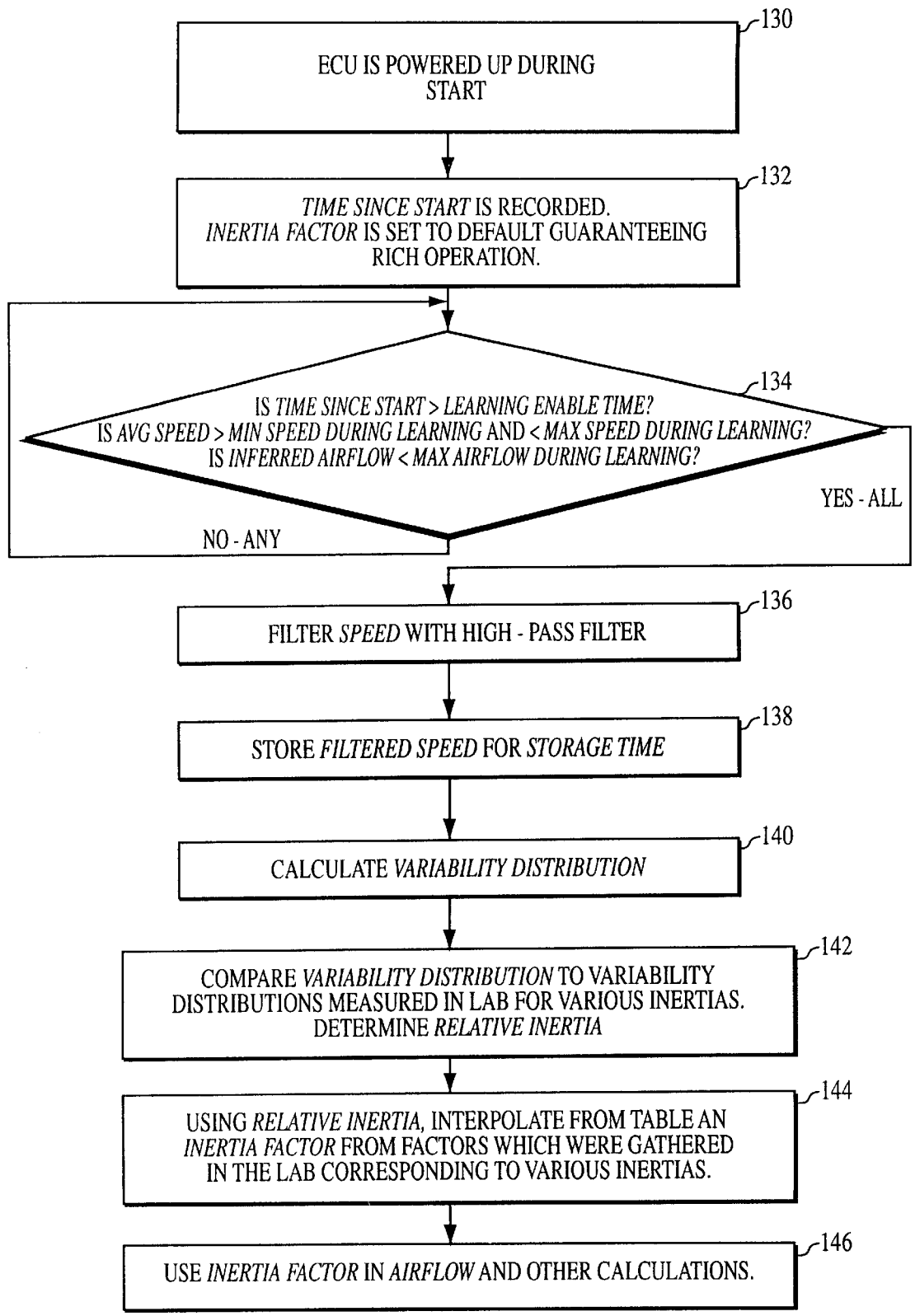
FIG. 4 is a flow chart illustrating operation of the system inertia field adjustment determining portion of the engine management system embodying the present invention.

The flowchart for adjusting the inertia factor is shown in FIG. 4 and begins with the microprocessor being powered up after the engine has been started (block 130). The time since the engine started is recorded and the inertia factor is set to the default value (block 132). The processor then notes if the time since the start is greater than the "learning enable time", if the average speed is greater than the "minimum speed" and less than the "maximum speed" (block 134), and if the inferred air flow is less than the "maximum air flow during learning". If all of then conditions are met, then the samples are accumulated and filtered (block 136). After the filtering has been accomplished, the filtered speed is stored (block 138) and the processor does a standard deviation calculation on the samples (block 140). The processor then compares the standard deviation to a standard deviation calculation for the various inertias that were measured in the laboratory tests and the relative inertia is thereby determined (block 142). This is then used to interpolate an inertia factor by interpolating those which were gathered in the laboratory corresponding to the various inertias (block 144) and a resulting inertia factor is determined.

While the inertia factor that has been described is particularly adapted for use in providing the air flow signal that is used to map fuel flow, it should be understood that the inertia factor may be useful in operating an electronic governor for example, so that the engine speed control system would be less susceptible to undesirable overshooting or undershooting when speed corrections are made.

From the foregoing description, it should be appreciated that the engine management system of the present invention has many desirable attributes. The system results in reliable and smooth operation of an engine because it uses the larger of two speed delta calculations which are obtained from filtering speed samples, and also reliably measures the system inertia of the engine so that an inertia factor can be used to compensate the speed delta. This results in a corrected air flow signal value which can be used as a variable in a fuel flow map so that the fuel injection system can provide the correct amount of fuel during operation.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for generating an output signal for controlling an operating parameter of an internal combustion engine having a combustion chamber, a rotating crankshaft, the engine being of the type which has alternating nonpower cycle and power cycle revolutions, wherein fuel is fed to and ignited in the combustion chamber engine during the power cycle revolutions, said apparatus comprising:

means for determining the cyclic engine speed of selected engine revolutions;

means for determining a difference value between the cyclic engine speed of one of said nonpower cycle revolutions and the cyclic engine speed of a successive power cycle revolution and a difference value between the cyclic engine speed of the said power cycle revolutions and the cyclic engine speed of a successive nonpower cycle revolution; and, means for generating the output signal that is a function of the larger of said determined difference values.

2. Apparatus as defined in claim 1 wherein said cyclic engine speed determining means comprises a sensing means adapted to sense the crankshaft at a predetermined angular position during its rotation and generate a signal in response thereto, and a timing means for measuring the time period between successively generated signals during successive engine revolutions.

3. Apparatus as defined in claim 2 wherein said sensing means comprises a variable reluctance speed sensor operatively connected to said crankshaft.

4. Apparatus as defined in claim 2 wherein said sensing means comprises a magneto.

5. Apparatus as defined in claim 2 wherein said timing means and said difference value determining means comprises a microprocessor.

6. Apparatus for generating an output signal for controlling the engine intake air flow of an internal combustion engine having a combustion chamber, a rotating crankshaft, the engine being of the type which has alternating nonpower cycle and power cycle revolutions, wherein the engine has a fuel injection system for feeding fuel to the combustion chamber and the operating parameter is engine intake air flow, said apparatus comprising:

means for determining the cyclic engine speed of selected engine revolutions;

means for determining a difference value between the cyclic engine speed of one of said nonpower cycle revolutions and the cyclic engine speed of a successive power cycle revolution and a difference value between the cyclic engine speed of the said power cycle revolutions and the cyclic engine speed of a successive nonpower cycle revolution;

means for generating the output signal that is a function of the larger of said determined difference values; and, means for determining the amount of fuel to be fed to the combustion chamber that is at least partially a function of said output signal.

7. Apparatus as defined in claim 6 wherein said apparatus further includes a filter means, said inertia factor being proportional to a statistical analysis of a plurality of filtered samples of measured engine speed.

8. Apparatus as defined in claim 7 wherein said filter means is a digital filter means, said statistical analysis comprises calculating a speed standard deviation value on said samples after having processed said samples through said digital filter means to pass only high frequency variable speed content above a predetermined frequency during operation of the engine at steady state operating conditions.

9. Apparatus as defined in claim 8 wherein said predetermined frequency is within a range of about 5 Hz to about 30 Hz.

10. Apparatus as defined in claim 8 wherein said steady state operating conditions are at no load applied to the engine operating a predetermined speed after the engine has been warmed up.

11. Apparatus as defined in claim 8 wherein said inertia factor is determined using said standard deviation calculated value to perform an interpolation of a number of speed standard deviation values that had been previously determined, with each previously determined standard deviation value being determined at predetermined operating conditions.

12. Apparatus as defined in claim 11 wherein said previously determined standard deviation values are measured at three predetermined operating conditions, with each of the three operating conditions having a different mass value operatively applied to the engine crankshaft.

13. Apparatus as defined in claim 12 wherein one of said mass values is zero, another is that which is supplied by a metal disc attached to said crankshaft, and the third is that which is supplied by two metal discs attached to said crankshaft.

14. Apparatus as defined in claim 13 wherein the inertia factor for said zero mass value is 1, and said operating conditions further including running the engine at a predetermined speed and wide open throttle.

15. Apparatus for generating an output signal for controlling an operating parameter of an internal combustion engine having a combustion chamber, a rotating crankshaft, the engine being of the type which has an electronically variable carburetor for feeding fuel to the combustion chamber and which has alternating nonpower cycle and power cycle revolutions, wherein fuel is fed to and ignited in the combustion chamber engine during the power cycle revolutions, said output signal being proportional to the magnitude of the air flow into the engine, said apparatus comprising:

means for determining the cyclic engine speed of selected engine revolutions;

means for determining a difference value between the cyclic engine speed of one of said nonpower cycle revolutions and the cyclic engine speed of a successive power cycle revolution and a difference value between the cyclic engine speed of the said power cycle revolutions and the cyclic engine speed of a successive nonpower cycle revolution, said difference value determining means comprises a microprocessor, said microprocessor having a memory means adapted to store values of a lookup table for determining the value of a fuel system signal that controls the amount of fuel that is fed to the engine by said electronically variable carburetor; and, means for generating the output signal that is a function of the larger of said determined difference values.

16. Apparatus as defined in claim 15 wherein the engine is of the type which has a fuel injection system and said fuel system signal controls the amount of fuel that is fed to the combustion chamber by the fuel injection system.

17. Apparatus for generating an output signal for controlling an operating parameter of an internal combustion engine having a rotating crankshaft, the engine being of the type which has alternating power cycle and nonpower cycle revolutions, wherein fuel is injected by a fuel injection system into a combustion chamber for ignition during the power cycle revolution, said apparatus comprising:

means for determining the cyclic engine speed of three successive engine revolutions of which one is a power cycle revolution;

means for determining a difference value between the cyclic engine speed of said power cycle revolution and the cyclic engine speed of each of said nonpower cycle revolutions;

means for determining a system inertia value that is indicative of the rotational inertia of the engine; and, means for generating the output signal as a function of the larger of said determined difference values and of the determined system inertia of the engine.

18. Apparatus as defined in claim 17 wherein said output signal is proportional to the magnitude of the air flow into the engine and said difference value determining means comprises a microprocessor, said microprocessor having a memory means adapted to store values in a lookup table for determining the value of a fuel system signal that controls the amount of fuel that is fed to the engine by the fuel injection system.

19. Apparatus as defined in claim 17 wherein the operating parameter is engine intake air flow, the value of the air flow being a function of said output signal divided by the last determined time period, said output signal comprising said larger difference value multiplied by said system inertia value.

20. Apparatus as defined in claim 19 wherein said inertia factor is proportional to a standard deviation value calculation on a plurality of filtered samples of measured engine speed.

21. Apparatus as defined in claim 20 wherein said apparatus includes a digital filter means, said speed standard deviation calculated value being determined by processing said samples through said digital filter means to pass only high frequency variable speed content above a predetermined frequency during operation of the engine at steady state operating conditions.

22. Apparatus as defined in claim 20 wherein said system inertia factor is determined using said speed standard deviation calculated value to perform an interpolation of a number of speed standard deviation values that had been previously determined, with each previously determined standard deviation value being determined at predetermined operating conditions.

23. Apparatus as defined in claim 22 wherein said previously determined standard deviation values are measured at three predetermined operating conditions, with two of the three operating conditions having a distinct mass value applied to the engine crankshaft, and the third having a zero mass value applied to the engine crankshaft.

24. Apparatus as defined in claim 23 wherein one of said two mass values comprises that which is applied by a metal disc attached to said crankshaft, and the other being that which is applied by two metal discs attached to said crankshaft.

25. Apparatus as defined in claim 24 wherein the inertia factor for said zero mass value is 1, and said operating conditions further including running the engine at a predetermined high speed.

26. A method of generating an output signal that controls an operating parameter of an internal combustion engine of the type which has an engine operating system that includes a processing means having a memory means, an engine speed sensing means, the engine being of the type which has alternating power cycle and nonpower cycle revolutions, wherein fuel is fed to a combustion chamber for ignition during the power cycle revolution, comprising the steps of:

determining the cyclic engine speed of selected engine revolutions;

determining a difference value between the cyclic engine speed of a power cycle revolution and the cyclic engine speeds of the prior and succeeding of said nonpower cycle revolutions;

determining the larger of the foregoing determined difference values;

determining a system inertia value that is indicative of the rotational inertia of the engine;

generating a first signal as a function of said larger determined difference, value; and, generating said output signal by varying said first signal by a factor that is a function of said system inertia value.

* * * * *